United States Patent
Zhong et al.

(10) Patent No.: US 9,614,250 B2
(45) Date of Patent: Apr. 4, 2017

(54) FLEXIBLE SOLID STATE CONDUCTORS INCLUDING POLYMER MIXED WITH PROTEIN

(71) Applicant: WASHINGTON STATE UNIVERSITY, Pullman, WA (US)

(72) Inventors: Wei-Hong Zhong, Pullman, WA (US); Jianying Ji, Beijing (CN); Bin Li, Wichita, KS (US)

(73) Assignee: Empire Technology Development LLC, Wilmington, DE (US)

( * ) Notice: Subject to any disclaimer, the term of this patent is extended or adjusted under 35 U.S.C. 154(b) by 322 days.

(21) Appl. No.: 14/223,017

(22) Filed: Mar. 24, 2014

(65) Prior Publication Data

US 2014/0212768 A1    Jul. 31, 2014

Related U.S. Application Data

(63) Continuation of application No. 13/636,027, filed as application No. PCT/US2012/037097 on May 9, 2012, now Pat. No. 8,722,254.
(Continued)

(51) Int. Cl.
H01M 6/16         (2006.01)
H01M 10/0564      (2010.01)
(Continued)

(52) U.S. Cl.
CPC ....... H01M 10/0525 (2013.01); H01M 6/162 (2013.01); H01M 8/1025 (2013.01);
(Continued)

(58) Field of Classification Search
CPC ............. H01M 8/1025; H01M 8/1041; H01M 8/1044; H01M 8/1069; H01M 8/1067;
(Continued)

(56) References Cited

U.S. PATENT DOCUMENTS

2002/0031701 A1    3/2002  Kawakami et al.
2005/0118508 A1*   6/2005  Yong ................... H01M 2/1673
                                                    429/246
(Continued)

FOREIGN PATENT DOCUMENTS

CN       1116213 A     2/1996
CN       101341615 A   1/2009
(Continued)

OTHER PUBLICATIONS

Li et al., Structure and Properties of Soy Protein/Poly(butylene succinate) Blends with Improved Compatibility, Oct. 2008, Biomacromolecules, 9, 3157-3164.*

(Continued)

*Primary Examiner* — Sean P Cullen
(74) *Attorney, Agent, or Firm* — Pepper Hamilton LLP

(57) ABSTRACT

Various embodiments of solid-state conductors containing solid polymer electrolytes, electronic devices incorporating the solid-sate conductors, and associated methods of manufacturing are described herein. In one embodiment, a solid-state conductor includes poly(ethylene oxide) having molecules with a molecular weight of about 200 to about $8\times10^6$ gram/mol, and a soy protein product mixed with the poly(ethylene oxide), the soy protein product containing glycinin and β-conglycinin and having a fine-stranded network structure. Individual molecules of the poly(ethylene oxide) are entangled in the fine-stranded network structure of the soy protein product, and the poly(ethylene oxide) is at least 50 % amorphous.

27 Claims, 5 Drawing Sheets

Related U.S. Application Data

(60) Provisional application No. 61/483,829, filed on May 9, 2011.

(51) Int. Cl.
| | | |
|---|---|---|
| *H01M 10/0565* | (2010.01) | |
| *H01M 10/0566* | (2010.01) | |
| *H01M 10/0568* | (2010.01) | |
| *H01M 10/0525* | (2010.01) | |
| *H01M 8/1025* | (2016.01) | |
| *H01M 8/1041* | (2016.01) | |
| *H01M 8/1044* | (2016.01) | |
| *H01M 8/1069* | (2016.01) | |
| H01M 8/1067 | (2016.01) | |
| H01M 10/052 | (2010.01) | |

(52) U.S. Cl.
CPC ....... *H01M 8/1041* (2013.01); *H01M 8/1044* (2013.01); *H01M 8/1069* (2013.01); *H01M 10/0565* (2013.01); H01M 8/1067 (2013.01); H01M 10/052 (2013.01); H01M 2300/0082 (2013.01); H01M 2300/0088 (2013.01); Y02E 60/521 (2013.01); Y02P 70/56 (2015.11)

(58) Field of Classification Search
CPC ............. H01M 6/162; H01M 10/0525; H01M 10/565; H01M 10/052; H01M 10/0565
USPC .......................... 429/317, 188, 303, 309, 314
See application file for complete search history.

(56) References Cited

U.S. PATENT DOCUMENTS

| | | | |
|---|---|---|---|
| 2008/0107966 A1* | 5/2008 | Lin ..................... | H01M 4/0402 429/209 |
| 2008/0113088 A1* | 5/2008 | Lin ........................ | C09J 189/06 427/77 |
| 2008/0220333 A1 | 9/2008 | Yano et al. | |
| 2013/0260259 A1 | 10/2013 | Zhong et al. | |

FOREIGN PATENT DOCUMENTS

| | | |
|---|---|---|
| JP | 2009-102525 | 5/2009 |
| JP | 2009-542264 A | 12/2009 |
| JP | 2010-519183 A | 6/2010 |
| JP | 2010-526189 A | 7/2010 |

OTHER PUBLICATIONS

Li et al., Rheology, Crystallization, and Biodegradability of Blends Based on Soy Protein and Chemically Modified Poly(butylene succinate), Apr. 2009, Industrial and Engineering Chemistry Research, 48, 4817-4825.*

Fang et al., Properties and Morphology of Poly(lactic acid)/Soy Protein Isolate Blends, Jun. 2009, Journal of Applied Polymer Science, 114, 754-759.*

Chinese Search Report for counterpart Chinese Patent Application No. CN 201280022052.8 dated Apr. 20, 2015.

Chinese Office Action for counterpart Chinese Patent Application No. CN 201280022052.8 dated Apr. 20, 2015.

Chorpade et al., Soy Protein Insolate/Poly(ethylene oxide) Films, *Cereal Chem.* (1995), 72(6):559-563.

International Search Report and Written Opinion for PCT/US2012/037097 dated Jun. 27, 2012.

Angell et al., Rubbery solid electrolytes with dominant cationic transport and high ambient conductivity, *Nature* (Mar. 11, 1993), 362:137-139.

Cao et al., Effects of Various Plasticizers on mechanical and water vapor barrier properties of gelatin films, *Food Hydrocolloids* (2009), 23:729-735.

Chiu et al., Investigating the Effect of Miscibility on the Ionic Conductivity of $LiClO_4$/PEO/PCL Ternary Blends, *mMacromolecules* (Oct. 7, 2004), 37(22):8424-8430.

Gitelman et al., Modeling and simulation of Li-ion conduction in poly(ethylene oxide), *Journal of Computational Physics* (Sep. 17, 2007), 227(2):1162-1175.

Ghorpade et al., Soy Protein Isolate/(poly(ethylene oxide) Films, *Cereal Chem.* (Jan. 1, 1995), 72(6):559-563.

Ji et al., An Ultraelastic Poly(ethylene oxide)/Soy Protein Film with Fully Amorphous Structure, *Macromolecules* (2012), 45:602-606.

Nan et al., Enhanced Ionic Conductivity of Polymer Electrolytes Containing Nanocomposite $SiO_2$ Particles, *Phys. Rev. Lett.* (Dec. 31, 2003), 91:266104.

Park et al., Effect of organic acids and nono-sized ceramic doping on PEO-based solid polymer electrolytes, *Journal of Power Sources* (Feb. 21, 2006), 160(1):674-680.

Stephan et al., Chitin-Incorporated Poly(ethylene oxide)-Based Nanocomposite Electrolytes for Lithium Batteries, *J. Phys. Chem. B* (Jan. 22, 2009), 113(7):1963-1971.

Yoshizawa et al., Preparation and characteristics of natural rubber/poly(ethylene oxide) salt hybrid mixtures as novel polymer electrolytes, *Polymer* (2000), 41:9049-9053.

Zhang et al., Blends of POSS-PEO(n=4)$_8$ and High Molecular Weight Poly(ethylene oxide) as Solid Polymer Electrolytes for Lithium Batteries, *J. Phys. Chem. B* (Mar. 21, 2007), 111(14):3583-3590.

* cited by examiner

US 9,614,250 B2

FLEXIBLE SOLID STATE CONDUCTORS INCLUDING POLYMER MIXED WITH PROTEIN

CROSS-REFERENCE TO RELATED APPLICATIONS

This application is a continuation filing under 35 U.S.C. §120 of and claims priority to U.S. patent application Ser. No. 13/636,027, filed Sep. 19, 2012, now U.S. Pat. No. 8,722,254 and entitled "FLEXIBLE SOLID STATE CONDUCTORS," which is a U.S. national stage filing under 35 U.S.C. §371 of International Application No. PCT/US2012/037097, filed May 9, 2012 entitled "Flexible Solid-State Conductors," the disclosure of which is incorporated by reference in its entirety, and which claims priority to U.S. Provisional Application No. 61/483,829 filed on May 9, 2011, the contents of which are incorporated herein by reference.

BACKGROUND

Requirements for increasing energy storage continue to grow. Next generation microelectronics demand a multitude of high performance battery products including flexible batteries, clean power for automobiles etc., and all will depend on new battery technology for longer cycle life, higher energy densities, better recharge ability and increased reliability. In addition, there will always be an environmental concern during production and use regarding safety and recycling. Further, since electrolytes in a battery conduct the ions, block electrons, and separate the electrodes to prevent shorting, the electrolytes are an important part of a battery, and the development of high performance "green" solid electrolytes will be significant for efficient battery technology, enhancement and broad applications.

Flexible electronic devices have certain functional advantages. For example, a flexible digital display may be used to output information from a computer, and then rolled up to save space when not in use. In another example, flexible solar cells have been developed for powering satellites. Such solar cells may be rolled up for launch, and are easily deployable when in orbit. Despite such functional advantages, conventional flexible electronic devices are typically externally powered because flexible batteries are not readily available. One challenge of producing flexible batteries is a lack of high quality solid-state conductors with good compliance or flexibility.

SUMMARY

This disclosure is not limited to the particular systems, devices and methods described, as these may vary. The terminology used in the description is for the purpose of describing the particular versions or embodiments only, and is not intended to limit the scope.

In one embodiment, a solid state conductor is provided, comprising at least one polymer comprising a polyether; and at least one protein product mixed with the polymer, wherein the protein product has a fine-stranded network structure; wherein individual molecules of the polyether are entangled in the fine-stranded network structure of the protein product such that the polyether molecules are at least about 50% amorphous.

In an alternative embodiment, an electronic device is provided, comprising a first electrode; a second electrode spaced apart from the first electrode; a solid polymer electrolyte disposed between the first electrode and second electrode, the solid polymer electrolyte having a flexibility of about 50% to about 700% and comprising: a plurality of polyether molecules; and at least one protein product mixed with the polyether molecules, the protein product having a plurality of protein strands in a fine-stranded network structure, wherein individual molecules of the polyether are entangled in the fine-stranded network structure of the protein product; wherein the solid polymer electrolyte has an electrical conductivity that allows an electrical current to flow between the first electrode and second electrode.

In an additional embodiment, a method for preparing a solid-state conductor is provided. The method can comprise providing a protein dispersion of a protein in a solvent; mixing a polyether material with the protein dispersion to form a polyether-protein mixture; and evaporating the solvent from the polyether-protein mixture to form the solid-state conductor.

DETAILED DESCRIPTION

Figure 1A:
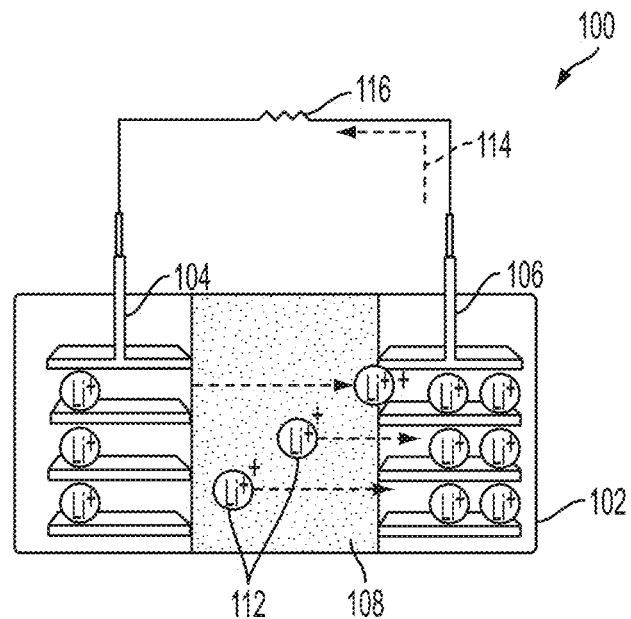
FIGS. 1A and 1B are schematic diagrams of an electronic device during various operating modes in accordance with embodiments of the present technology.

Various embodiments of solid-state conductors containing solid polymer electrolytes ("SPEs"), electronic devices incorporating the solid-sate conductors, and associated methods of manufacturing are described below. The term "solid polymer electrolyte" or "SPE" is used throughout to refer to a solid polymer material that is capable of transporting ions and/or other charge carriers to effect ionic and/or other types of conductivity (collectively referred to herein as "electrical conductivity"). A person skilled in the relevant art will also understand that the technology may have additional embodiments, and that the technology may be practiced without several of the details of the embodiments described below with reference to FIGS. 1A-4.

Solid polymer electrolytes (SPEs) that possess high ionic conductivity and attractive mechanical compliance are in great demand for a broad range of electronic and power applications. Though the initial work has concentrated on their function in lithium ion batteries, applications now also may include chemical sensors, organic thin film transistors, electromechanical actuators, polymer light emitting electrochemical cells, and gas separation membranes. For some applications of SPEs, it is desirable to incorporate high ionic conductivity while maintaining the mechanical properties. Further, for additional applications of SPEs, it may be desirable for SPEs to possess both high ionic conductivity and also high elasticity, which is required to make thin and flexible devices for the next generation electronics and high power density applications.

Highly flexible and conductive SPEs may also be usable for stretchable artificial skins for humans. Such skins are commercially available, but they lack electric functionality. Various stretchable materials, such as rubber, are used in daily activities, but they have poor electrical properties. For some artificial skin applications it may be desirable that the skin include stretchable active electronic elements and interconnects. A power sources may be needed for the operation of the skin-like sensitivity, and ideally, a power source directly integrated onto the skin would be preferred for easy system integrations.

Highly flexible and conductive SPEs are needed for foldable/flexible devices in high power density applications. It is believed that neither an elastomer blended poly(ethylene oxide) (PEO), nor a "polymer in salt" reached an acceptable electrical conductivity at room temperatures. Developing high performance SPEs using a bio-material can be also challenging. Protein, such as soy protein, is one of the most abundant renewable resources. However, soy protein products may be rigid and may lead to poor processability and brittleness for polymer blends. For example, strain of poly(ester urethane) film decreased from 750% to less than 50% after addition of 20 wt % of soy protein isolate (SPI). However, it has been discovered that by blending protein, such as SPI, with a polyether, such as PEO, a highly flexible protein-based SPE (s-SPE) with high electrical conductivity may be produced.

SPEs based on PEO have certain advantages: (1) possible to produce thin films of large surface areas, (2) flexibility in designs, (3) no corrosive or powerful solvents, and (4) batteries or other electrical devices produced may be packaged in low-pressure containers. However, PEO-based SPEs have rarely found commercial success due to low ionic conductivity and/or insufficient mechanical properties. Both of these properties are believed to be related to movement of polymer chains. For example, high chain mobility within a polymer can lead to high ionic conductivity but can lead to reduced mechanical properties at the same time. Thus, enhancements in both properties are usually in conflict. Many physical/chemical methods have been exploited to create enhancement in both ionic conductivity and mechanical properties. Though some suggested techniques have shown promise, the complex strategies involved have introduced other challenging issues.

In several embodiments of the present technology, a bio-polymer is combined with a polymer to form SPE materials suitable as solid-state conductors. The bio-polymer may contain a protein product. The polymer may contain a polyether. The formed SPE materials have a generally amorphous structure that can enhance ionic conductivity, while providing adequate flexibility and other mechanical properties for fabrication and handling. In several examples discussed below, SPI is used as an example bio-polymer to be combined with an example polymer, PEO, to prepare example SPE materials. While SPI is used as an example bio-polymer, other bio-polymers, proteins, or mixtures of two or more proteins or bio-polymers may similarly be used. Based on experiments conducted, the SPE materials have desirable properties such as high ionic conductivity, good thermal properties, high cation transference number, electrochemical stability, and stable electrolyte-electrode interface for batteries. In particular, the flexibility of the SPE materials may be controlled by adjusting a denatured structure of the soy protein. Moreover, the SPE materials may be easy to fabricate, and may be considered environmentally friendly in both processing and material usage.

Figure 1B:
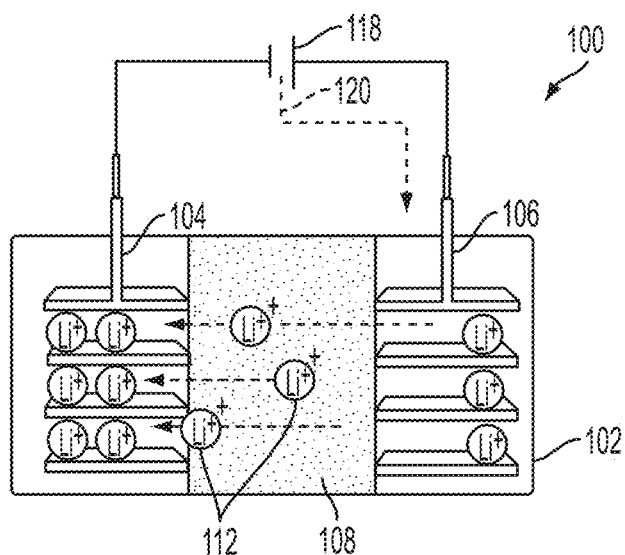

FIGS. 1A-1B are schematic diagrams of an electronic device during various operating modes in accordance with embodiments of the present technology. For illustration purposes, the electronic device is described below using a lithium-ion battery 100 as an example. FIG. 1A shows the lithium-ion battery 100 during discharging, and FIG. 1B shows the lithium-ion battery 100 during charging. In other embodiments, the electronic device can be configured as other types of battery containing sodium, potassium, calcium, magnesium, cadmium, or copper ions, a chemical sensor, an organic thin film transistor, an electromechanical actuator, a polymer light emitting diode, a gas separation membrane, a fuel cell, and/or other suitable electronic devices.

As shown in FIGS. 1A and 1B, the lithium-ion battery 100 may include a housing 102 holding a first electrode 104, a second electrode 106, and an SPE 108 between the first and second electrodes 104 and 106. The lithium-ion battery 100 can also include salts such as $LiPF_6$, $LiAsF_6$, $LiClO_4$, $LiBF_4$, and lithium triflate contained in the SPE 108.

In certain embodiments, the SPE 108 can include a polymer and a protein product mixed with the polymer. Additional details of the composition and molecular structure of the SPE 108 are discussed below with respect to FIG. 1C. Even though particular components are illustrated in FIGS. 1A and 1B, in other embodiments, the lithium-ion battery 100 can also include insulators, gaskets, vent holes, and/or other suitable components (not shown).

In one embodiment, the first electrode 104 can include a carbonaceous material (e.g., graphite), tin (Sn), zinc (Zn), lead (Pb), antimony (Sb), bismuth (Bi), silver (Ag), gold (Au), and/or other element electrodeposited on and alloy with lithium (Li), or combinations thereof. In another embodiment, the first electrode 104 can also include a binary, ternary, or higher order mixtures of the elements that can be electrodeposited on and alloy with lithium (Li). Examples of binary mixtures include Sn—Zn, Sn—Au, Sn—Sb, Sn—Pb, Zn—Ag, Sb—Ag, Au—Sb, Sb—Zn, Zn—Bi, Zn—Au, and combinations thereof. Examples of ternary mixtures include Sn—Zn—Sb, Sn—Zn—Bi, Sn—Zn—Ag, Sn—Sb—Bi, Sb—Zn—Ag, Sb—Zn—Au, Sb—Sn—Bi, and combinations thereof. An example of a quaternary mixture can include Sn—Zn—Sb—Bi. In yet another embodiments, the first electrode 104 can include intermetallic compounds of elements (e.g., the generally pure elements discussed above) and other elements that can be electrodeposited and alloy with lithium (Li). Examples of such intermetallic compounds include Sn—Cu, Sn—Co, Sn—Fe, Sn—Ni, Sn—Mn, Sn—In, Sb—In, Sb—Co, Sb—Ni, Sb—Cu, Zn—Co, Zn—Cu, Zn—Ni, and combinations thereof.

The second electrode 106 can be constructed from a layered oxide (e.g., lithium cobalt oxide ($LiCoO_2$)), a polyanion (e.g., lithium iron phosphate ($LiFePO_4$)), or a spinel (e.g., lithium manganese oxide ($LiMn_2O_4$)). Other suitable materials for the second electrode 106 can include lithium nickel oxide ($LiNiO_2$), lithium iron phosphate fluoride ($Li_2FePO_4F$), lithium cobalt nickel manganese oxide ($LiCo_{1/3}Ni_{1/3}Mn_{1/3}O_2$), $Li(Li_aNi_xMn_yCo_z)O_2$, combinations thereof, and/or other suitable cathode materials.

As shown in FIG. 1A, during discharging, lithium ions 112 are extracted from the first electrode 104 and migrate toward the second electrode 106 via the SPE 108. The lithium ions 112 pass through the SPE 108 and are inserted into the second electrode 106. As a result, a current 114 flows from the second electrode 106 past a load 116 to the first electrode 104. As shown in FIG. 1B, during charging, a charger 118 provides a charging current 120 to the second electrode 106. The charging current 120 causes lithium ions 112 to be extracted from the second electrode 106 and move toward the first electrode 104.

In an embodiment, such a flexible and conductive SPE may be incorporated into an artificial skin to provide the artificial skin with electrical functionality. A bio-polymeric, elastomeric, ionic conductive SPE film may be configured as a battery in a manner similar to that of FIGS. 1A and 1B, and may be integrated as a layer with an artificial skin to form a single sheet. An SPE film formed in the manner as discussed herein may be configured to feel and look like real skin, and can have similar flexibility characteristics as does real skin.

Figure 1C:
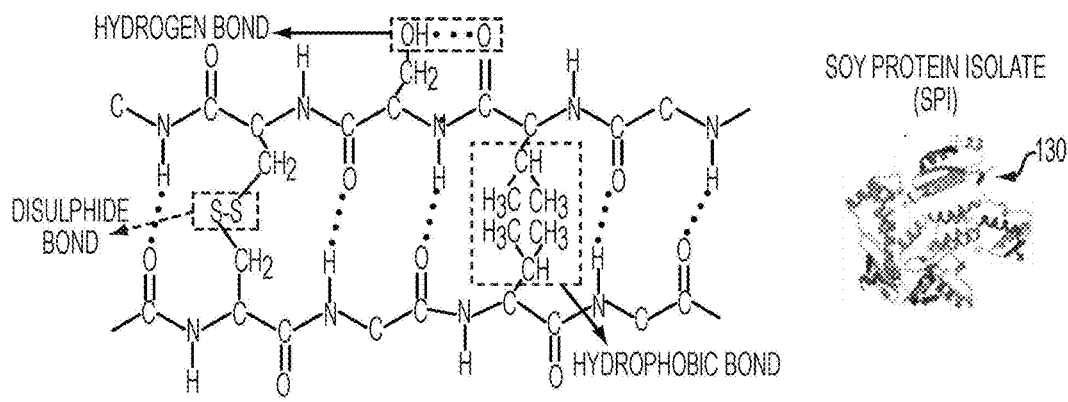
FIG. 1C shows chemical structures and perspective views of a solid-state conductor suitable for the electronic device in FIGS. 1A and 1B in accordance with embodiments of the technology.
Figure 1C:
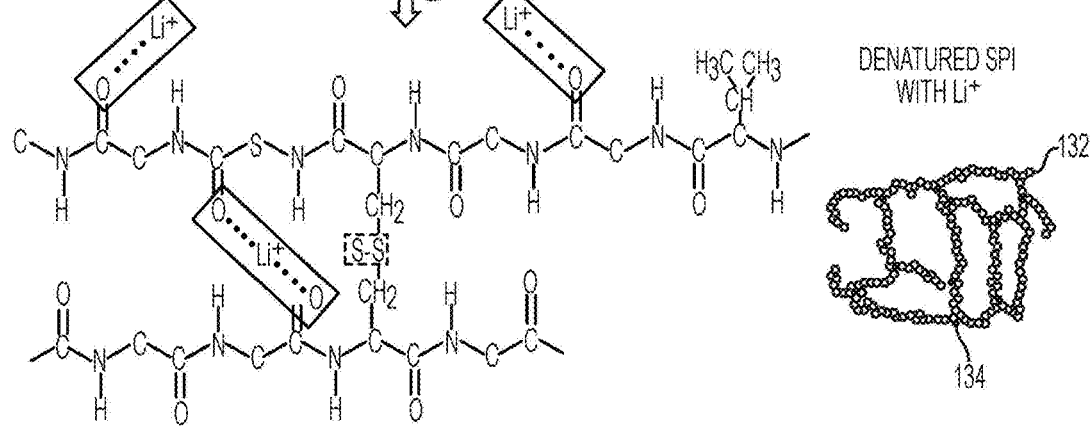
Figure 1C:
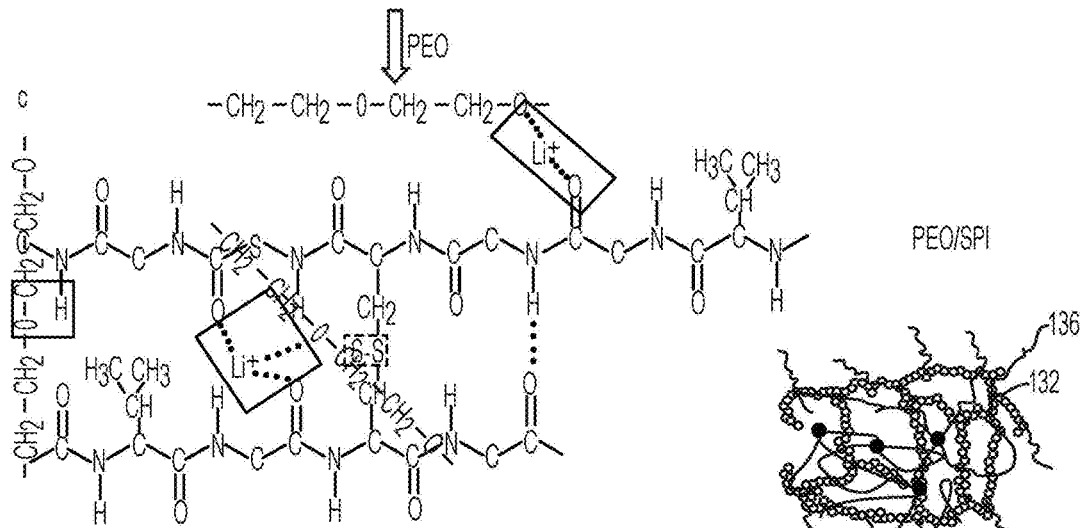

FIG. 1C shows chemical structures and schematic perspective views of an SPE and constituents in accordance with embodiments of the technology. As discussed above, the SPE can include a polymer and a bio-polymer containing protein product mixed with the polymer. In certain embodiments, the polymer can include a polyether with one or more ether functional groups (—C—O—C—). One example of polyether is PEO having a molecular weight of about 200 to about $8 \times 10^6$ gram/mol. Other Examples of polyether can include polyethylene glycol (PEG), polyoxyethylene (POE), polypropylene oxide, other oligomer or polymer of ethylene oxide, and/or derivatives thereof. In other embodiments, the polymer can include polyamines, polyamides, polyketones, and/or other suitable polymers with repeating carbonyl (—C=O), carboxyl (—COOH), hydroxyl (—OH), amino (—NH$_3$), and/or other suitable polar functional groups. In certain embodiments herein, the polymer may have functional groups including a first polar group and a second polar group. In another embodiment, the first polar group includes a first oxygen polar group and the second polar group includes a second oxygen polar group.

The protein product can include an extract or isolate from plants or other natural resources, a purified protein, or can include a synthesized substance. For example, in certain embodiments, the protein product can include a soy protein product containing glycinin and β-conglycinin. Examples of such soy protein product can include a soy food with about 6% to about 50% soy protein, a soy flour with about 50% to about 80% soy protein, a soy meal with about 80% to about 90% soy protein, and an SPI with about 90% soy protein or higher. In other embodiments, the protein product can also include a protein product derived from peanuts, almonds, milk, black beans, sunflower seeds, wheat, rice, and/or other suitable plants or plant products.

In certain embodiments, a ratio of the soy protein product to the PEO can be about 20:80 by weight to about 60:40 by weight. For example, in one embodiment, a ratio of the soy protein product to the PEO is about 25:75. In another embodiment, a ratio of the soy protein product to the PEO is about 30:70. In another embodiment, a ratio of the soy protein product to the PEO is about 35:65. In another embodiment, a ratio of the soy protein product to the PEO is about 40:60. In another embodiment, a ratio of the soy protein product to the PEO is about 45:55. In another embodiment, a ratio of the soy protein product to the PEO is about 50:50. In yet another embodiment, a ratio of the soy protein product to the PEO is about 55:45. In further embodiments, the ratio of the soy protein product to the PEO can have other suitable values.

The protein product can contain a plurality of protein strands in a fine-stranded network structure. As used herein, the term "fine-stranded" generally refers to a structural feature in which individual strands are at least partially unfolded in a thread or a threadlike configuration. Without being bound by theory, it is believed that proteins extracted from plants or plant products are typically folded into a globular or fibrous form. For example, as shown in part (a) in FIG. 1C, glycinin in SPI has one basic and one acidic polypeptide, which are linked to each other by a single disulfide bond. β-conglycinin is a trimeric glycoprotein including three types of subunits a, a', and 3, in seven different combinations. The subunits are believed to be associated through hydrophobic and hydrogen bonding, which can cause the protein strands to have a coil-like structure 130.

A process generally referred to as "denaturation" may be performed to at least partially unfold the protein strands in order to form the fine-stranded network structure. Denaturation may be done by heating a dispersion of the protein product in solution, changing the pH of the protein product solution, adding denaturing agents such as urea and guanidine hydrochloride, or via other suitable techniques and combinations of the techniques. During denaturation, the bonding interactions responsible for the secondary and tertiary structures in protein strands may be disrupted, resulting in an unfolding of the coiled structure 130 and leading to a fine-stranded network structure with unfolded strands 132, as shown in part (b) of FIG. 1C. Also shown in part (b) of FIG. 1C, ions (e.g., lithium ions) 134, which in at least some embodiments may be provided by various salts, can be strongly adsorbed onto the surface of the soy protein product due to the negative acid group in the SPI. Thus, a preferential protein—salt binding results in effective protein—protein repulsion. As a result, as used herein, "denaturation" generally refers to any modification of secondary, tertiary, or quaternary structure of protein molecules generally without breaking covalent bonds. The pH can generally be any pH. In some embodiments, the pH is greater than 7 (basic). For example, the pH can be about 7, about 8, about 9, about 10, about 11, about 12, about 13, about 14, and ranges between any two of these values (such as about 10 to about 11).

Some examples of salts which may be included in embodiments of SPEs along with the protein and the polymer, may include, but are not limited to, $LiPF_6$, LiTFSI, $LiBF_4$, $LiClO_4$, $LiN(CF_3SO_2)_2$, $LiAsF_6$, $LiCF_3SO_3$, LiI, $LiBC_4O_8$(LiBOB), $Li[PF_3(C_2F_5)_3]$, LiTf, LiIm, LiBr, LiCl, LiSCN, LiTFSM, NaI, $LiCF_3CO_2$, NaBr, NaSCN, KSCN, $MgCl_2$, $Mg(ClO_4)_2$. The amount of the salt that is included may range from about 1% to about 45%, and may be about 1%, about 5%, about 10%, about 15%, about 20%, about 25%, about 30%, about 35%, about 40%, about 45%, or any amount between any two of these values, or any other suitable amount.

In an exemplary embodiment wherein the salt may be about 10 wt % to about 25 wt % of the SPE, and a ratio of the protein product to the polymer may be about 45:55, the weight percentages of the protein and the polymer may be about 33 wt % to about 40 wt % protein and about 41 wt % to about 49 wt % polymer. In another exemplary embodiment, wherein the salt may be about 10 wt % to about 25 wt % of the SPE, and a ratio of the protein product to the polymer may be about 50:50, the weight percentages of the protein and the polymer may both be about 37 wt % to about 45 wt %. In yet another exemplary embodiment, wherein the salt may be about 10 wt % to about 25 wt % of the SPE, and a ratio of the protein product to the polymer may be about 55:45, the weight percentages of the protein and the polymer may be about 41 wt % to about 49 wt % protein and about 33 wt % to about 40 wt % polymer.

As shown in part (c) of FIG. 1C, the PEO molecules 136 are entangled in the fine-stranded network structure of the protein product. The SPI protein strands are surrounded by the PEO molecules 136 having a chain-like configuration, rather than making a protein—protein contact. The "electron-rich" sites in the PEO molecules 136 are absorbed to lithium ions or bonded to a positive ammonium group of the protein strands 132. The foregoing structural features highly disturb the order of the PEO molecules 136, resulting in a highly amorphous structure. At the same time, the cross-linking or entanglements between PEO and SPI contribute to high mechanical flexibility, for example, about 50% to about 700%. As used herein, the term "flexibility" generally refers to a percentage of deformation at which a material can return to an original dimension and shape within certain tolerances (e.g., within about 5%, about 10%, about 15%, or other suitable percentage values) generally without damage.

Even though the SPE is described above as being based on a mixture of PEO and SPI containing a lithium salt, in other embodiments, the SPE may include other suitable polymers, salts, and/or bio-polymer products having the structures and functional groups described below. In further embodiments, the SPE can also include a filler material, a stiffener material, a carrier material, and/or other suitable materials. In addition, the SPE may be formed as a film, a block, a pellet, and/or other suitable geometric configurations.

Figure 2:
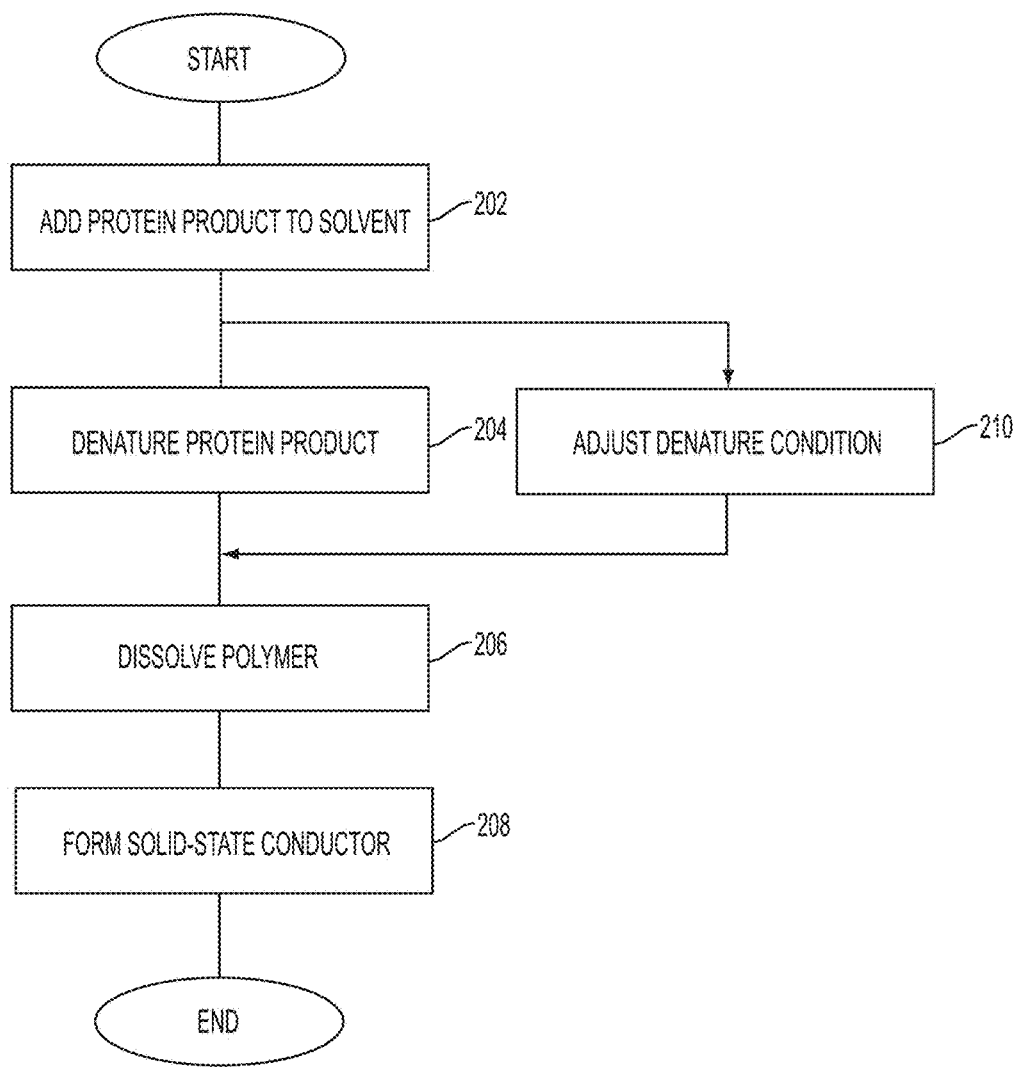
FIG. 2 is a flowchart showing a method of manufacturing a solid-state conductor suitable for the electronic device of FIGS. 1A and 1B in accordance with embodiments of the technology.

FIG. 2 is a flowchart showing a method of manufacturing a solid-state conductor suitable for the electronic device of FIGS. 1A and 1B in accordance with embodiments of the technology. As shown in FIG. 2, stage 202 of the method can include adding a protein product to a solution or solvent to form a protein dispersion. The solvent can generally be any solvent, such as an aqueous solvent or a non-aqueous solvent. The solvent can be a single solvent or a co-solvent combination of two or more solvents (such as water with an alcohol such as methanol or ethanol). In some examples, the solvent is water. In other examples, the solvent is water with one or more dissolved substances (such as salts, buffers, acids, bases, and so on). The method also includes denaturing the protein product in the protein dispersion at stage 204. As discussed above, in certain embodiments, the protein product can be denatured by heating the protein dispersion at a pH and temperature for a target period of time. In other embodiments, the protein product can also be denatured by sonication, radiation, and/or other suitable techniques. Subsequently, a polymer can be dissolved in the protein dispersion at stage 206 to form a polymer-protein mixture. The polymer-protein mixture can then be casted, spray dried, baked, and/or otherwise processed to form the solid-state conductor at stage 208.

As shown in FIG. 2, the method can optionally further include adjusting at least one of the pH of the solvent, the treatment temperature, the treatment period, or other suitable denaturing conditions 210 based on at least one of a target electrical conductivity or a mechanical flexibility of the solid-state conductor. It is believed that protein chemistry involves many interactions, including electrostatic interactions and hydrogen bonding, hydrophobic interactions, covalent bonding, and ionic bonding. Protein structure changes during the denaturation process to allow interactions between protein and polar groups in the polymer and between the protein and a salt to occur. As a result, by adjusting at least one of the denaturing conditions, a target morphology may be obtained. The target morphology may be about 50% amorphous, about 60% amorphous, about 70% amorphous, about 80% amorphous, about 90% amorphous, about 95% amorphous, about 100% amorphous, or ranges between any two of these values.

Several experiments were performed to produce and test s-SPEs according to aspects of the present technology. During these experiments, bio-elastomeric and electrically conductive materials were prepared using a solution casting technique. Protein dispersions were prepared by magnetically stirring appropriate amount of protein (e.g., SPI) in 60 ml of lithium perchlorate ($LiClO_4$) solution with pH of about 10 and then sonicating for about 1 hour. The resultant dispersions were heated at about 95° C. for about 10 hours. Then 1 g of PEO powder was dissolved into the above dispersion and the mixture was magnetically agitated. Before casting, the mixture was sonicated for another hour. The mixture was cast on a smooth polyethylene substrate to let the solvent evaporate. Subsequently, an s-SPE film was obtained. Solvent can be evaporated by a variety of methods. Examples include heating, exposing to reduced pressure, ventilation, and passive evaporation.

Figure 3A:
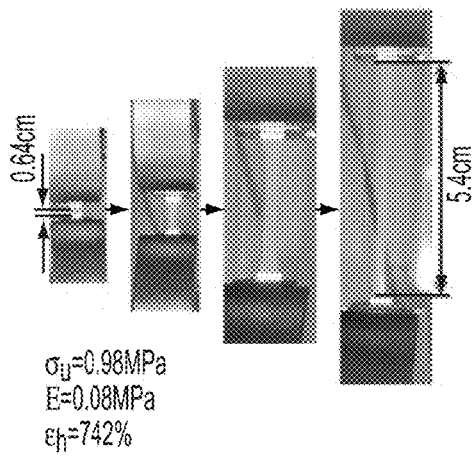
FIG. 3A shows a series of four photographs of tensile tests performed on a solid-state conductor prepared according to embodiments of the method in FIG. 2.

Elasticity of the s-SPE film was examined by tensile tests and nano-indentation. FIG. 3A is a series of four photographs showing the s-SPE film in a tensile process. The average ultimate tensile strength, $\sigma_u$, was 0.98±0.07 MPa; the elastic modulus (E) was 0.08±0.02 MPa; and the elongation at break is greater than about 740%. In contrast, pure PEO based electrolyte (p-SPE) film was too sticky to be peeled off from a substrate without damage. Thus, a nano-indentation approach was applied to compare the mechanical properties between s-SPE and p-SPE.

Figure 3B:
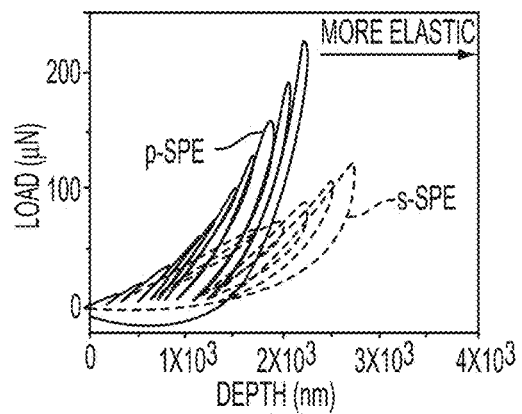
FIG. 3B shows a plot of load in $\mu N$ (y-axis) vs. depth in nm (x-axis). The p-SPE film is indicated with solid lines, while the s-SPE film is indicated with dashed lines.

FIG. 3B shows that the s-SPE film was much more elastic than the p-SPE film. FIG. 3B shows a plot of load in μN (y-axis) vs. depth in mm (x-axis), where movement down and towards the right indicate more elasticity. The p-SPE film is indicated with solid lines, while the s-SPE film is indicated with dashed lines. Without being bound by theory, it is believed that the high flexibility of the s-SPE film is related to the micro-structures thereof. Distinct spherulites were visible in the p-SPE film using polarized optical images. With the addition of denatured SPI, no spherulites were observed, which indicated a near amorphous state of the s-SPE film. Results of mechanical tests are shown in the table below.

| Sample | Ultimate Stress (MPa) | Modulus (MPa) | Strain at breaking point (%) |
|---|---|---|---|
| p-SPE | 0.31 ± 0.05 | 14.50 ± 6.45 | 305.50 ± 208.42 |
| s-SPE | 0.98 ± 0.53 | 0.06 ± 4.42 | 742.62 ± 11.53 |

Figure 3C:
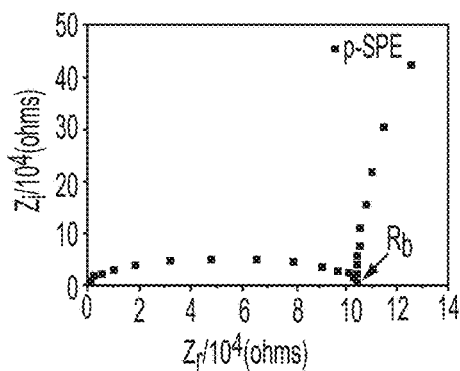
FIG. 3C shows an impedance spectra obtained for the p-SPE film (square symbols). The x-axis is $Z_r/10^4$ (ohms), with a scale of 0-14. The y-axis is $Z_i/10^4$ (ohms), with a scale of 0-50. The bulk resistance is indicated as $R_b$.
Figure 3D:
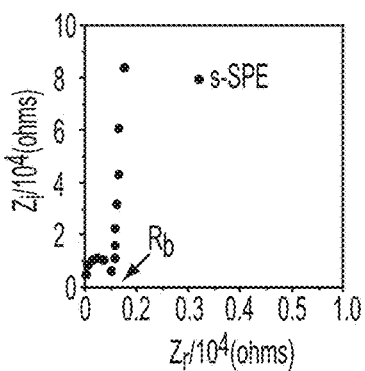
FIG. 3D shows an impedance spectra obtained for the s-SPE film (round symbols). The x-axis is $Z_r/10^4$ (ohms), with a scale of 0-1. The y-axis is $Z_i/10^4$ (ohms), with a scale of 0-10. The bulk resistance is indicated as $R_b$.

FIGS. 3C and 3D shows an impedance spectra obtained for the p-SPE film (FIG. 3C; square symbols) and s-SPE film (FIG. 3D; round symbols). The bulk resistance (Rb) of the s-SPE film (about 0.1) was significantly reduced compared to that of the p-SPE film (about 10.5). Thus, a significant enhancement in electrical conductivity was observed in the s-SPE film when compared to the p-SPE film. Without being bound by theory, it is believed that such an enhancement was due to increases in both charge carriers and ion mobility. For example, soy protein molecules with a helical structure typically include a large amount of polar functional groups. After denaturation, the folded protein structure was transformed to an unfolded threadlike configuration, which favors lithium salt dissociation. The amorphous state of the s-SPE film accommodates a high degree of polymer segment mobility above $T_g$ (e.g., −40° C.) to provide a favorable environment for ion transportation.

Figure 3E:
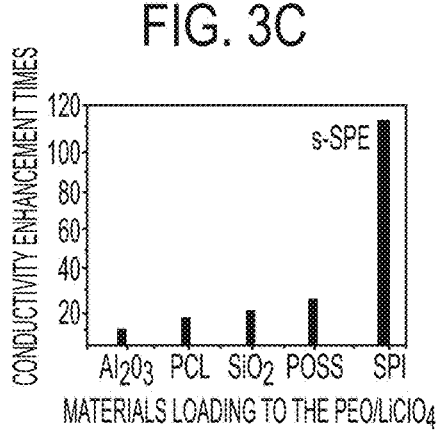
FIG. 3E is a bar graph with the x-axis being various material loaded to the $PEO/LiClO_4$, and the y-axis being conductivity enhancement times with a scale of 0-120.

FIG. 3E shows a bar graph comparison of reported conductivity results of PEO nano-composites with nanoparticles (such as $Al_2O_3$, $SiO_2$, and polyhedral oligomeric silsesquioxanes (POSS)) and polymer blend (poly(ε-caprolactone) added into PEO (PCL)), against the s-SPE film (SPI). The conductivity results for the materials other than SPI were obtained from reported literatures. The conductivity enhancement with the s-SPE film was at least about eighty times higher than other techniques.

Figure 3F:
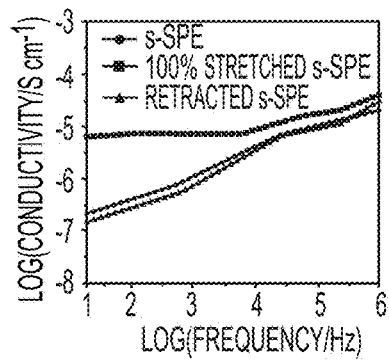
FIG. 3F is a plot of log(frequency/Hz) (x-axis; scale of 1-7) against log (conductivity/5 cm$^{-1}$) (y-axis; scale of −8 to −3). The square symbols represent as-received s-SPE film; the round symbols represent 100% stretched s-SPE film; and the diamond symbols represent retracted s-SPE film.

FIG. 3F shows a frequency dependent ionic conductivity of the as-received, stretched, and retracted s-SPE film. The square symbols represent as-received s-SPE film; the round symbols (upper line) represent 100% stretched s-SPE film; and the triangle symbols (substantially the bottom-most line) represent retracted s-SPE film. As shown in FIG. 3F, the s-SPE film was elongated up to 100% and relaxed without loss of ionic conductivity, as the lines for the as-received and retracted films (bottom pair of lines) essentially overlap.

Figure 4:
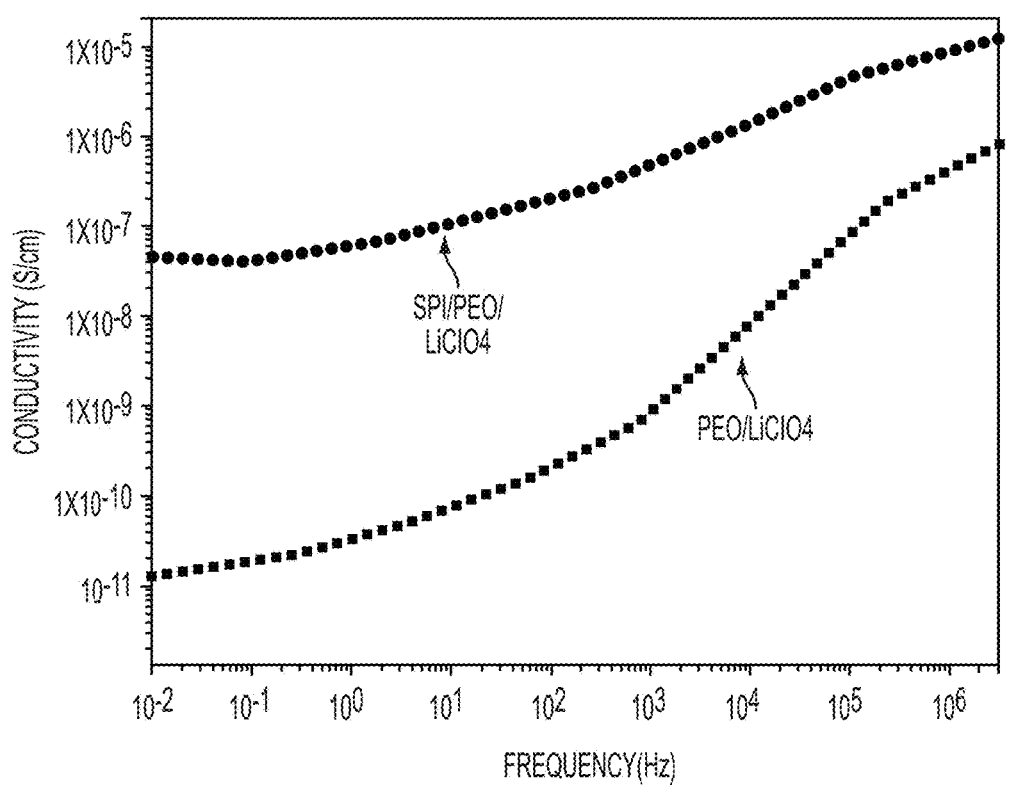
FIG. 4 shows an example conductivity versus frequency plot for a solid-state conductor prepared according to embodiments of the method in FIG. 2. The x-axis is frequency (Hz), and the y-axis is conductivity (S/cm).

FIG. 4 shows an equivalent conductivity versus frequency plot for a PEO film and the s-SPE film prepared according to embodiments of the method in FIG. 2. The concentration of $LiClO_4$ in both materials was about 22 wt %. As shown in FIG. 4, the conductivity of the two materials increased with increasing frequency. In the $SPI/PEO/LiClO_4$ system (upper curve; round symbols), the conductivity values increased two orders higher compared with that without SPI (lower curve; square symbols). Without being bound by theory, it is believed that conductivity in SPEs, the motion of cations and anions and the number of mobile charges are affected by the interactions between the salt and the polar matrix. Such interactions include hydrogen bonding, dipole-dipole, ion-dipole, charge transfer or transition metal complexation. Denatured SPI can have many polar groups, thus the addition of SPI is believed to facilitate dissociation of lithium salt. As a result, the number of the free charge carriers increased.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An electronic device comprising:
   a first electrode;
   a second electrode spaced apart from the first electrode; and
   a solid polymer electrolyte disposed between the first electrode and the second electrode, the solid polymer electrolyte comprising:
      at least one salt;
      a plurality of polymer molecules;
      at least one denatured protein mixed with the polymer molecules, wherein individual molecules of the plurality of polymer molecules are entangled in the denatured protein, wherein the protein is derived from plants or plant products; and
      wherein the solid polymer electrolyte comprises about 1 wt % to about 45 wt % of the at least one salt, and has conductivity that allows ions to flow between the first electrode and the second electrode.

2. The electronic device of claim 1, wherein the solid polymer electrolyte comprises about 10 wt % to about 25 wt % of the at least one salt, about 33 wt % to about 40 wt % of the plurality of polymer molecules, and about 41 wt % to about 49 wt % of the at least one denatured protein.

3. The electronic device of claim 1 wherein the plurality of polymer molecules comprises poly(ethylene oxide).

4. The electronic device of claim 1, wherein the protein comprises a soy protein.

5. The electronic device of claim 1, wherein the at least one salt comprises at least one of $LiPF_6$, LiTFSI, $LiBF_4$, $LiClO_4$, $LiN(CF_3SO_2)_2$, $LiAsF_6$, $LiCF_3SO_3$, LiI, $LiBC_4O_8$, $Li[PF_3(C_2F_5)_3]$, LiTf, Lilm, LiBr, LiCl, LiSCN, LiTFSM, NaI, $LiCF_3CO_2$, NaBr, NaSCN, KSCN, $MgCl_2$, and $Mg(ClO_4)$.

6. The electronic device of claim 1, wherein an oxygen polar group of one of the plurality of polymer molecules is bound to an ammonium group of one of strands of the denatured protein.

7. The electronic device of claim 1, wherein the solid polymer electrolyte has an ionic conductivity that allows ions of the at least one salt to migrate between the first electrode and the second electrode.

8. The electronic device of claim 1, wherein individual carbonyl groups of one of strands of the denatured protein are bound to a cation of the at least one salt to effect repulsion from adjacent strands of the denatured protein.

9. The electronic device of claim 1, wherein:
   at least one strand of the denatured protein has a carbonyl group;
   at least one of the plurality of polymer molecules has a first oxygen polar group and a second oxygen polar group;
   a cation of the at least one salt is bound to the first oxygen polar group of the one of the plurality of polymer molecules and to the carbonyl group of the at least one strand of the denatured protein; and the second oxygen polar group of the at least one of the plurality of polymer molecules is bound to an ammonium group of the at least one strand of the denatured protein.

10. A solid polymer electrolyte comprising:
at least one denatured protein,
wherein the at least one denatured protein is derived from plants or plant products;
at least one polymer comprising at least one polar functional group, wherein individual molecules of the at least one polymer are entangled in the at least one denatured protein; and
about 10 wt% to about 45 wt% of at least one salt.

11. The solid polymer electrolyte of claim 10, comprising about 33 wt % to about 40 wt % of the at least one polymer, about 41 wt % to about 49 wt % of the at least one denatured protein, and about 10 wt % to about 25 wt % of the at least one salt.

12. The solid polymer electrolyte of claim 10, wherein:
a ratio of the at least one denatured protein to the at least one polymer is about 55:45 by weight;
the at least one polymer molecules are about 100% amorphous; and
the solid polymer electrolyte is deformable by about 50% to about 700% from an original configuration without damage to the solid polymer electrolyte.

13. The solid polymer electrolyte of claim 10, wherein the at least one salt comprises at least one of $LiPF_6$, LiTFSI, $LiBF_4$, $LiClO_4$, $LiN(CF_3SO_2)_2$, $LiAsF_6$, $LiCF_3SO_3$, LiI, $LiBC_4O_8$, $Li[PF_3(C_2F_5)_3]$, LiTf, Lilm, LiBr, LiCl, LiSCN, LiTFSM, NaI, $LiCF_3CO_2$, NaBr, NaSCN, KSCN, $MgCl_2$, and $Mg(ClO_4)$.

14. The solid polymer electrolyte of claim 10, wherein the at least one denatured protein comprises a soy protein.

15. The solid polymer electrolyte of claim 14, wherein the soy protein comprises glycinin, β-conglycinin, or a combination thereof.

16. The solid polymer electrolyte of claim 10, wherein the at least one polymer has a molecular weight of about 200 gram/mol to about $8 \times 10^6$ gram/mol.

17. The solid polymer electrolyte of claim 16, wherein the at least one polymer comprises poly(ethylene oxide).

18. The solid polymer electrolyte of claim 10, further comprising a plurality of cations noncovalently bound with the at least one polymer, the at least one denatured protein, or both.

19. The solid polymer electrolyte of claim 18, wherein the cations comprise $Li^+$, $K^+$, $Na^+$, $Ca^{2+}$, $Mg^{2+}$, $Cd^{2+}$, $Al^{3+}$, $Zn^{2+}$, $Fe^{2+}$, $Fe^{3+}$, $Pb^{2+}$, $Cu^{2+}$, $Ag^+$, or a combination thereof.

20. A method to prepare a solid polymer electrolyte, the method comprising:
dissolving at least one salt in a solvent to form a salt solution;
mixing a protein with the salt solution to form a protein dispersion,
wherein the protein is derived from plants or plant products;
denaturing the protein in the protein dispersion to form a denatured protein dispersion;
mixing a polymer with the denatured protein to form a polymer-protein mixture; and
evaporating the solvent from the polymer-protein mixture to form the solid polymer electrolyte,
wherein the solid polymer electrolyte comprises about 10 wt% to about 45 wt% of the at least one salt.

21. The method according to claim 20, wherein the solid polymer electrolyte comprises about 10 wt% to about 25 wt% of the at least one salt, about 33 wt% to about 40 wt% of the polymer, and about 41 wt% to about 49 wt% of the denatured protein.

22. The method according to claim 20, wherein mixing the protein with the at least one salt comprising mixing a soy protein.

23. The method according to claim 20, wherein mixing with the polymer comprises mixing poly(ethylene oxide).

24. The method according to claim 20, wherein mixing the protein with the at least one salt comprises mixing with at least one of $LiPF_6$, LiTFSI, $LiBF_4$, $LiClO_4$, $LiN(CF_3SO_2)_2$, $LiAsF_6$, $LiCF_3SO_3$, LiI, $LiBC_4O_8$, $Li[PF_3(C_2F_5)_3]$, LiTf, Lilm, LiBr, LiCl, LiSCN, LiTFSM, NaI, $LiCF_3CO_2$, NaBr, NaSCN, KSCN, $MgCl_2$, and $Mg(ClO_4)$.

25. The method according to claim 20, wherein dissolving the at least one salt comprising dissolving in water.

26. The method according to claim 20,
wherein the solvent has a pH, and the method further comprises:
heating the protein dispersion at a treatment temperature for a treatment period prior to mixing with the polymer; and
adjusting at least one of the pH of the solvent, the treatment temperature, or the treatment period based on at least one of a target electrical conductivity or a targeted mechanical flexibility of the solid polymer electrolyte.

27. The method according to claim 20, further comprising adjusting at least one of a ratio between the polymer and the protein, or the polymer and a composition of the protein, based on at least one of a target electrical conductivity or a target mechanical flexibility of the solid polymer electrolyte.

* * * * *

UNITED STATES PATENT AND TRADEMARK OFFICE
CERTIFICATE OF CORRECTION

PATENT NO.       : 9,614,250 B2
APPLICATION NO.  : 14/223017
DATED            : April 4, 2017
INVENTOR(S)      : Zhong et al.

Page 1 of 1

It is certified that error appears in the above-identified patent and that said Letters Patent is hereby corrected as shown below:

In the Specification

In Column 1, Line 9, delete "§120" and insert -- § 120 --, therefor.

In Column 1, Line 13, delete "§371" and insert -- § 371 --, therefor.

In Column 2, Line 51, delete "(conductivity/5 cm$^{-1}$)" and insert -- (conductivity/S cm$^{-1}$) --, therefor.

In Column 6, Line 30, delete "a, a', and 3," and insert -- α, α', and β, --, therefor.

In the Claims

In Column 12, Line 38, in Claim 3, delete "claim 1" and insert -- claim 1, --, therefor.

In Column 14, Line 11, in Claim 20, delete "protein" and insert -- protein dispersion --, therefor.

In Column 14, Line 34, in Claim 25, delete "comprising" and insert -- comprises --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*